United States Patent
Yang et al.

(10) Patent No.: US 11,191,000 B2
(45) Date of Patent: *Nov. 30, 2021

(54) METHOD OF SENDING BEAM REPORT AND NON-TRANSITORY COMPUTER-READABLE STORAGE MEDIUM

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,230

(22) Filed: Dec. 2, 2020

(65) Prior Publication Data

US 2021/0092663 A1 Mar. 25, 2021

Related U.S. Application Data

(63) Continuation of application No. 16/637,712, filed as application No. PCT/CN2018/099573 on Aug. 9, 2018, now Pat. No. 10,887,814.

(30) Foreign Application Priority Data

Aug. 10, 2017 (CN) .......................... 201710681954.7

(51) Int. Cl.
*H04W 36/06* (2009.01)
*H04W 36/30* (2009.01)

(52) U.S. Cl.
CPC ......... *H04W 36/305* (2018.08); *H04W 36/06* (2013.01)

(58) Field of Classification Search
CPC .... H04B 7/0695; H04B 7/088; H04B 7/0408; H04B 7/0632; H04B 17/318;
(Continued)

(56) References Cited

U.S. PATENT DOCUMENTS 10,887,814 B2 * 1/2021 Yang .................... H04W 24/10
2013/0307727 A1 11/2013 He et al.
(Continued)

FOREIGN PATENT DOCUMENTS

| CN | 102905291 A | 1/2013 |
|----|-------------|--------|
| CN | 104321984 A | 1/2015 |
| WO | 2016165128 A1 | 10/2016 |

OTHER PUBLICATIONS

1st Chinese Office Action for Chinese Application No. 201710681954.7, dated Mar. 27, 2020 (dated Mar. 27, 2020)—7 pages (English translation—6 pages).

(Continued)

*Primary Examiner* — Rahel Guarino
(74) *Attorney, Agent, or Firm* — Culhane Meadows PLLC; Stephen J. Weed

(57) ABSTRACT

A method of sending a beam report and a terminal thereof are provided. The method includes: monitoring a quality parameter of at least one beam link; and determining, according to the quality parameter of the beam link, at least one beam link subjected to a quality loss; in the case that at least a first preset quantity of beam link of the at least one beam link subjected to the quality loss is the beam link of a target antenna panel, determining that a shielding event of the target antenna panel is detected and sending a beam report to a network.

16 Claims, 6 Drawing Sheets

(58) Field of Classification Search
CPC .. H04B 17/391; H04W 72/046; H04W 16/28; H04W 72/085; H04W 72/0413; H04W 36/305; H04W 36/30; H04W 36/06; H04W 36/0058; H04W 72/1231; H04W 36/0055; H04W 36/36; H04W 76/20
See application file for complete search history.

(56) References Cited

U.S. PATENT DOCUMENTS

| | | |
|---|---|---|
| 2014/0241446 A1 | 8/2014 | Zhang et al. |
| 2015/0011159 A1 | 1/2015 | Marinov et al. |
| 2018/0034531 A1* | 2/2018 | Sadiq ................. H04W 72/046 |
| 2018/0042000 A1 | 2/2018 | Zhang et al. |

OTHER PUBLICATIONS

Extended European Search Report for European Application No. 18844020.0, dated May 27, 2020 (dated May 27, 2020)—15 pages.
Intel Corporation: "On Beam State Reporting," R1-1702197, 3GPP TSG-RAN WG1 #88, Athens, Greece, Feb. 13, 2017, 6 pages.
International Search Report and Written Opinion for International Application No. PCT/CN2018/099573, dated Feb. 20, 2020 (dated Feb. 20, 2020)—9 pages (English translation—6 pages).
Vivo: "Discussion on beam recovery," R1-1704489, 3GPP TSG RAN WG1 Meeting #88bis, Spokane, Washington, US, Apr. 3, 2017, 4 pages.
Zte et al.: "Way Forward on Beam Reporting for NR MIMO," R1-1703525, 3GPP TSG RAN WG1 Meeting #88, Athens, Greece, Feb. 13, 2017, 5 pages.

* cited by examiner

METHOD OF SENDING BEAM REPORT AND NON-TRANSITORY COMPUTER-READABLE STORAGE MEDIUM

CROSS REFERENCE OF RELATED APPLICATION

The present application claims the benefit of and is a continuation application of U.S. patent application Ser. No. 16/637,712 filed on Feb. 7, 2020 which is the U.S. national phase of PCT Application PCT/CN2018/099573 filed on Aug. 9, 2018, which claims a priority of Chinese patent application No. 201710681954.7 filed on Aug. 10, 2017, which is incorporated herein by reference in its entirety.

TECHNICAL FIELD

The present disclosure relates to the field of communication technologies, and in particular, to a method of sending a beam report and a terminal thereof.

BACKGROUND

In the related art, the analog beamforming is transmitted in full bandwidth, and each polarization direction array element on the panel of each high-frequency antenna array can only transmit the analog beam in a time division multiplexed manner. The shaping weight of the analog beam is achieved by adjusting the parameters of the RF front-end phase shifter and other equipment.

At present, in the academia and industry, the training of analog beamforming vectors is usually carried out in a polling manner, that is, the array elements of each polarization direction of each antenna panel sequentially send training signals at an agreed time in a time division multiplexing manner ((i.e., the candidate forming vector). After the measurement, the terminal reports a beam report for the network side to use the forming vector used by the training signal to implement the analog beam transmission in the next transmission service.

The network side configures the beam reporting setting information for the UE through high-level signaling, that is, the reporting setting, which includes the content information of the beam report, the time-domain related messages (periodic, aperiodic, and semi-persistent) of the beam report, and frequency granularity information of the beam report, etc. The content information in the beam report may include: identity information of at least one optimal transmission beam selected by the UE, physical layer measurement results (such as L1-RSRP) of the beam selected by the UE, grouping information of the beam selected by the UE, and the like.

In a high-frequency communication system, since the wavelength of a wireless signal is short, it is more likely that signal propagation is blocked and the like, resulting in signal propagation interruption. In the case that the wireless link reconstruction in the related art is adopted, it takes a long time, so a beam failure recovery mechanism is introduced, that is, the beam failure detection reference signal is monitored at the physical layer, and whether the quality of the reference signal meets the beam failure trigger condition is evaluated. Once this condition is met, the UE can transmit a beam failure recovery request to the base station. The request may include a new candidate beam recommended to the base station. After receiving the request, the base station sends a response signaling to the terminal, the response signaling may include switching to a new candidate beam, restarting a beam search, or other indication. This beam failure recovery mechanism can quickly switch to a standby BPL (beam pair link, which includes a transmission beam and a reception beam) to continue sending control messages and data to achieve rapid beam recovery.

In the current design of terminal products, a large proportion is a metal casing, and the two antennas are divided into main and auxiliary, which are arranged at different positions of the terminal, for example, two antennas are arranged respectively at the upper and lower portions of the back of the terminal. When the user uses the terminal, for a terminal with a metal casing, it is easy for the antenna of a certain terminal to be blocked (such as the user holding a hand to death).

For future 5G terminals, an antenna panel is usually used to set a high-band antenna, for example, two panels. Then, the antenna panel of a certain terminal may also be blocked.

Generally, the terminal manufacturers use implementation methods to solve this problem, such as measuring the received signal power on the two antennas. When the difference between the received power on the two antennas reaches a certain level, the terminal switches itself to an antenna with a stronger received power to transmit uplink signals. Alternatively, based on the echo measurement method, by comparing the strength and phase of the echo signal of the transmitted signal, it is determined whether the antenna is blocked.

In a millimeter-wave system, in the case that the beam link currently used for transmission is blocked (handhold), in the case that the beam link is not switched to the other beam link connected well in time, the transmission will be interrupted.

However, the beam measurement and reporting and beam failure recovery mechanisms in the related art do not define a mechanism where a terminal quickly detects the shielding event and reports the same quickly.

SUMMARY

A method of sending a beam report and a terminal thereof are provided in the present disclosure, to solve the technical issue in the related art that the transmission is interrupted when the beam shielding is not reported timely and the transmission is interrupted when the network switches to the beam of the shielded antenna panel due to that the antenna panel being shielded cannot be reported.

In one aspect, a method of sending a beam report is provided in the present disclosure, applied to a terminal and including:

monitoring a quality parameter of at least one beam link; and determining, according to the quality parameter of the beam link, at least one beam link subjected to a quality loss;

in the case that at least a first preset quantity of beam link of the at least one beam link subjected to the quality loss is the beam link of a target antenna panel, determining that a shielding event of the target antenna panel is detected and sending a beam report to a network;

where the beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

In another aspect, a method of sending a beam report is provided in the present disclosure, applied to a terminal and including:

monitoring received signal strength information of at least one beam link;

determining that a shielding event of the beam link is detected and sending a beam report to a network, in the case that a quantity of the beam link of which the received signal strength information meets a first preset condition is greater than or equal to a second preset quantity; where the beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

In another aspect, a terminal is provided in the present disclosure, including:

a first monitoring module, configured to monitor a quality parameter of at least one beam link; and a first loss determining module, configured to determine, according to the quality parameter of the beam link, at least one beam link subjected to a quality loss;

a first sending module, configured to: in the case that at least a first preset quantity of beam link of the at least one beam link subjected to the quality loss is the beam link of a target antenna panel, determine that a shielding event of the target antenna panel is detected and send a beam report to a network;

where the beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

A terminal is provided in the present disclosure, including a memory, a processor and a computer program stored in the memory and executable on the processor, where the computer program is executed by the processor to perform the method of sending a beam report hereinabove.

A computer-readable storage medium is provided in the present disclosure, where a computer program in the computer-readable storage medium, where the computer program is executed by a processor to perform the method of sending a beam report hereinabove.

A terminal is provided in the present disclosure, including:

a second monitoring module, configured to monitor received signal strength information of at least one beam link;

a second sending module, configured to: determine that a shielding event of the beam link is detected and send a beam report to a network, in the case that a quantity of the beam link of which the received signal strength information meets a first preset condition is greater than or equal to a second preset quantity; where the beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

A terminal is provided in the present disclosure, including a memory, a processor and a computer program stored in the memory and executable on the processor, where the computer program is executed by the processor to perform the method of sending a beam report hereinabove.

A computer-readable storage medium is provided in the present disclosure, where a computer program in the computer-readable storage medium, where the computer program is executed by a processor to perform the method of sending a beam report hereinabove.

BRIEF DESCRIPTION OF THE DRAWINGS

In order to explain the technical solutions of the embodiments of the present disclosure more clearly, the drawings used in the description of the embodiments of the present disclosure are briefly introduced below. Obviously, the drawings in the following description are only some embodiments of the present disclosure. For those of ordinary skill in the art, other drawings may be obtained based on these drawings without any creative work.

DETAILED DESCRIPTION

In the following, the technical solutions in the embodiments of the present disclosure will be clearly and completely described with reference to the drawings in the embodiments of the present disclosure. Obviously, the described embodiments are a part of the present disclosure, but not all of them. Based on the embodiments of the present disclosure, all other embodiments obtained by a person of ordinary skill in the art without creative efforts shall fall within the scope of the present disclosure.

Figure 1:
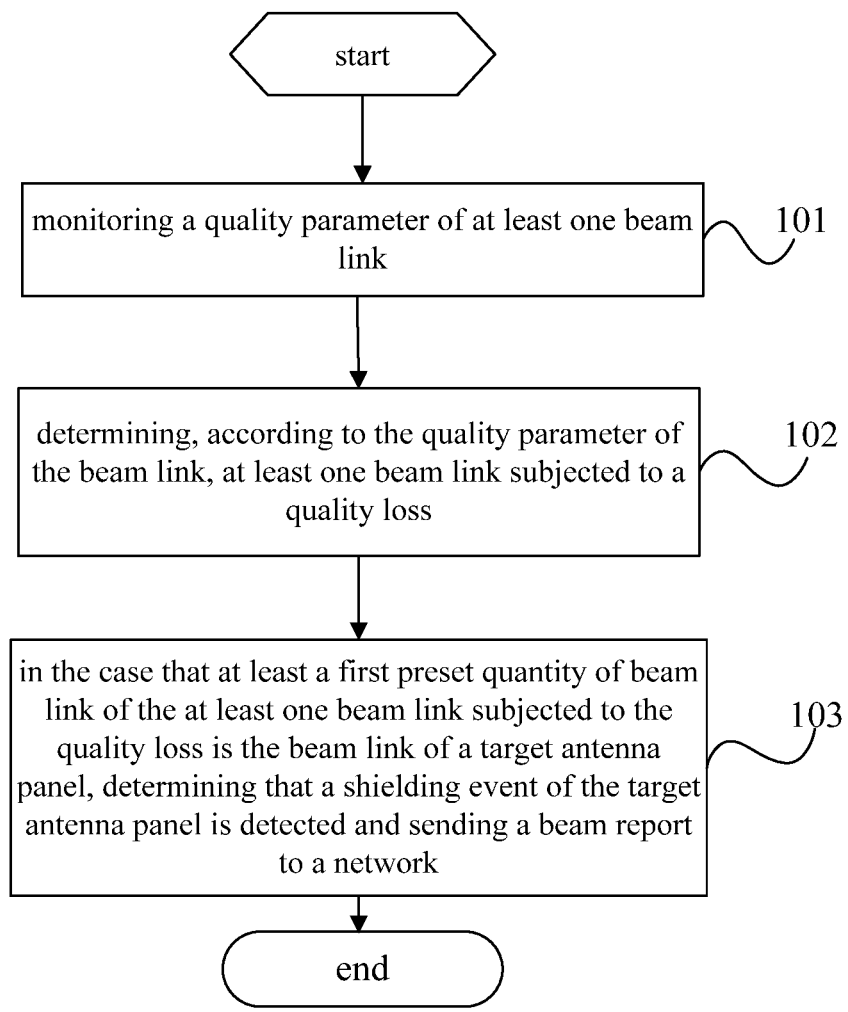
FIG. 1 is a first flowchart of a method of sending a beam report in an embodiment of the present disclosure.

As shown in FIG. 1, a method of sending a beam report is provided in an embodiment of the present disclosure, applied to a terminal and including:

Step 101: monitoring a quality parameter of at least one beam link.

In this step, the quality parameter of the beam link includes: a Received Signal Strength Indicator (RSSI) of the beam link and/or a Reference Signal Received Power (RSRP) of the beam link.

It should be noted that the RSSI of the beam link can be measured by the terminal in real time, and it is not limited to any measurement timing. The RSRP of the beam link can only be measured when the terminal receives the reference signal sent by the network. Generally, since the reference signal is sent periodically, the RSRP of the beam link may only be measured periodically. Compared with the RSRP of the beam link, when the quality parameter of the beam link is the RSSI of the beam link, the monitoring of the terminal is more real-time, and the shielding event can be found earlier.

Step 102: determining, according to the quality parameter of the beam link, at least one beam link subjected to a quality loss.

In this step, in the case that the quality parameter of the beam link is less than a first preset threshold, it is determined that a quality loss occurs on the beam link.

It should be noted that when the quality parameter of the beam link is RSSI or RSRP, the first preset threshold value corresponds to RSSI or RSRP, and the first preset threshold value is not used to limit a specific value. The first preset threshold value may change with the change of the quality parameter, which is not specifically limited herein.

Step 103: in the case that at least a first preset quantity of beam link of the at least one beam link subjected to the quality loss is the beam link of a target antenna panel, determining that a shielding event of the target antenna panel is detected and sending a beam report to a network;

The beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

In this step, the first preset quantity is a preset value. For example, in the case that the target antenna panel corresponds to 6 beam links, the first preset quantity may be set to an integer less than or equal to 6. For example, in the case that the first preset quantity is 4, when a quality loss occurs on at least 4 beam links corresponding to the target antenna panel, it is determined that a shielding event of the target antenna panel is detected, and a beam report is further triggered to the network. The network may perform a fast beam switching based on the beam report and resume a data transmission, thereby improving a reliability of the data transmission.

It should be noted that in the above embodiments of the present disclosure, parameters such as the first preset quantity, the first preset threshold value, the quantity of monitored beam links, and the like, may be pre-agreed by a protocol, or configured by a network, or determined by the terminal itself, which is not specifically limited here.

Specifically, the first indication information included in the beam report reported by the terminal may be represented by a 1-bit indication bit. For example, in the case that the indication bit is "1", it indicates that the target antenna panel is shielded, and when the indication bit is "0", it indicates that no shielding event has occurred on the target antenna panel. The second indication information included in the beam report reported by the terminal is used to indicate the reason why the terminal sends the beam report, such as a shielding event on the target antenna panel or damage to the target antenna panel.

Figure 2:
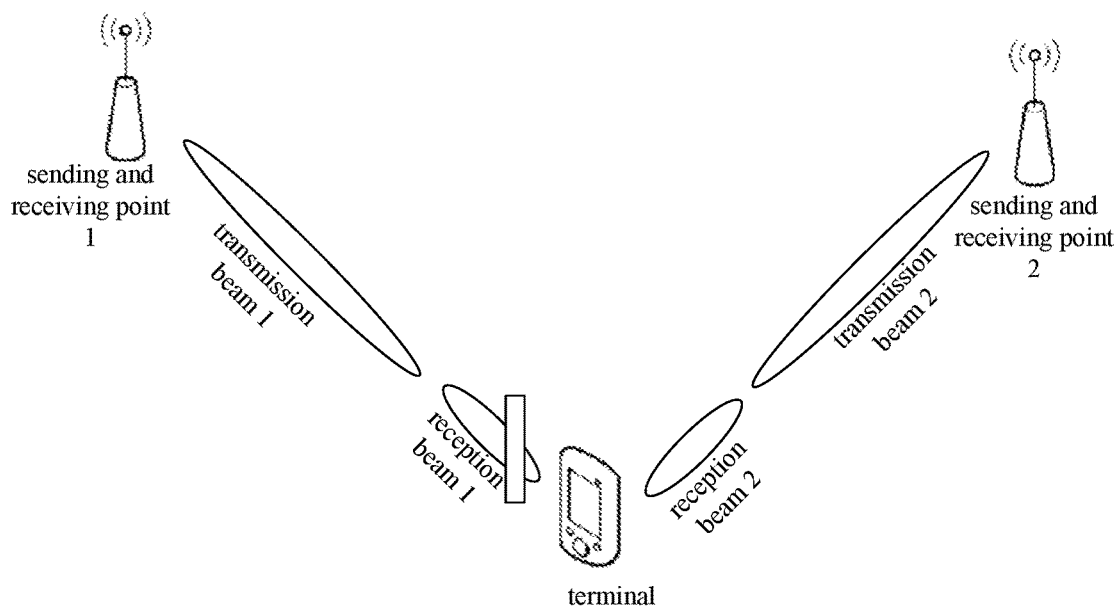
FIG. 2 is a schematic view illustrating a specific example of a method of sending a beam report in an embodiment of the present disclosure.

As shown in FIG. 2, two transmitting and receiving points (TRPS) on the network side are connected to the terminal. The user holds the first antenna panel of the terminal when using the terminal. Due to holding the terminal, the average value of multiple measurements of the quality parameter of the beam link between transmission beam 1 and reception beam 1 meaured by the terminal within a preset time period configured by the network is lower than a preset threshold, and then a shielding event occurs on the first antenna panel. The terminal uses a beam report to tell the network that a shielding event occurs on the first antenna panel, and the network switches to a beam link which between the transmission beam 2 and the reception beam 2 corresponding to the second antenna panel based on the beam report.

Further, step 103 in the foregoing embodiment of the present disclosure includes:

sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Specifically, the resource where the beam report is located may be any one of the following resources:

1. reserved resources configured by the network for the terminal through a high-level signaling;

2. a resource through which the terminal reports a periodic beam report, i.e., the resource of the periodic beam report multiplexed by the beam report in the embodiment of the present disclosure;

3. a resource through which the terminal transmits a beam failure recovery request, i.e., a resource for a beam failure recovery request of a beam failure recovery mechanism multiplexed by the beam report in the embodiment of the present disclosure;

4. a first uplink resource scheduled by the network for the terminal after the shielding event of the target antenna panel is detected, where in the case that the target resource is the first uplink resource scheduled by the network for the terminal in the case that the shielding event of the target antenna panel is detected, the terminal carries the beam report by a Medium Access Control Control Element (MAC CE).

The use of any of the foregoing resources may make the beam report in the embodiment of the present disclosure to be compatible with the periodically reported beam report in the related art, thereby improving the application range of the method of transmission beam report in the embodiment of the present disclosure, and reducing the modification of the method of periodically reporting the beam report in the related art, so as to save costs.

Further, in the above embodiment of the present disclosure, the beam report further includes:

identity information of a downlink transmission beam of at least one beam link recommended by the terminal to be switched to by the network, where the at least one beam link recommended by the terminal to be switched to by the network is a beam link corresponding to an antenna panel other than the target antenna panel.

The method of sending a beam report in the embodiment of the present disclosure is applied to a terminal having at least two antenna panels; for example, when the terminal includes a first antenna panel and a second antenna panel, in the case that the first antenna panel is a target antenna panel where a shielding event occurs, the at least one beam link recommended by the terminal to be switched to by the network is a beam link corresponding to the second antenna panel.

It should be noted that in the above embodiments of the present disclosure, the quality parameter of the at least one beam link recommended by the terminal to be switched to by the network also need to meet the data transmission requirements, for example, the quality parameter of at least one beam link recommended by the terminal to be switched to by the network is greater than or equal to a preset value. Generally, the beam link recommended by the terminal to be switched to by the network is one or more beam links with better quality parameter.

Further, in the foregoing embodiment of the present disclosure, the beam report further includes: a RSRP of the downlink transmission beam of the at least one beam link recommended by the terminal to be switched to by the network.

It should be noted that the content contained in the beam report can be used as reference data when the network performs beam switching. The network does not necessarily select the downlink transmission beam from the beam link recommended by the terminal, and the network can also perform a beam training to determine the downlink transmission beam, the network needs to inform the terminal of the downlink transmission beam it has selected after determining the downlink transmission beam, so that the terminal can select a suitable reception beam for data transmission. The embodiment of the present disclosure does not limit the behavior of the network side.

Further, in the above-mentioned embodiment of the present disclosure, in order to improve the accuracy of determining whether a quality loss occurs on the beam link, the step 102 includes:

acquiring a plurality of quality parameters of the beam link detected within a preconfigured preset time period or within a preset time period configured by a network;

acquiring a statistical average of the plurality of quality parameters; and in the case that the statistical average is less than a second preset threshold value, determining that the beam link is subjected to the quality loss.

Since there may be a large error in the quality parameter of the beam link obtained in real time, in the embodiment of the present disclosure, an average value of multiple quality parameters is obtained by counting multiple quality parameters of the same beam link in a preset time period, and then the average value is taken as the quality parameter of the beam link in a preset time period, thereby improving the accuracy of the quality parameter; and determining whether the beam link is subjected to a quality loss based on the quality parameter of the beam link in the preset time period, thereby further improving the accuracy of the determination.

It should be noted that the second preset threshold value may be the same as or different from the first preset threshold value; the second preset threshold value may also be pre-agreed by the protocol, or configured by the network, or determined by the terminal itself. Of course, it is not specifically limited herein.

In summary, according to the foregoing embodiments of the present disclosure, the terminal determines whether a shielding event occurs on an antenna panel according to the quantity of beam links subjected the quality loss on the antenna panel, and triggers a beam report to the network when the shielding event occurs on the antenna panel, so that the network may know that a shielding event occurs on the target antenna panel, so that the network may switch to the beam link corresponding to the antenna panel where no shielding event has occurred, so as to perform data transmission, thereby improving the reliability of data transmission.

Figure 3:
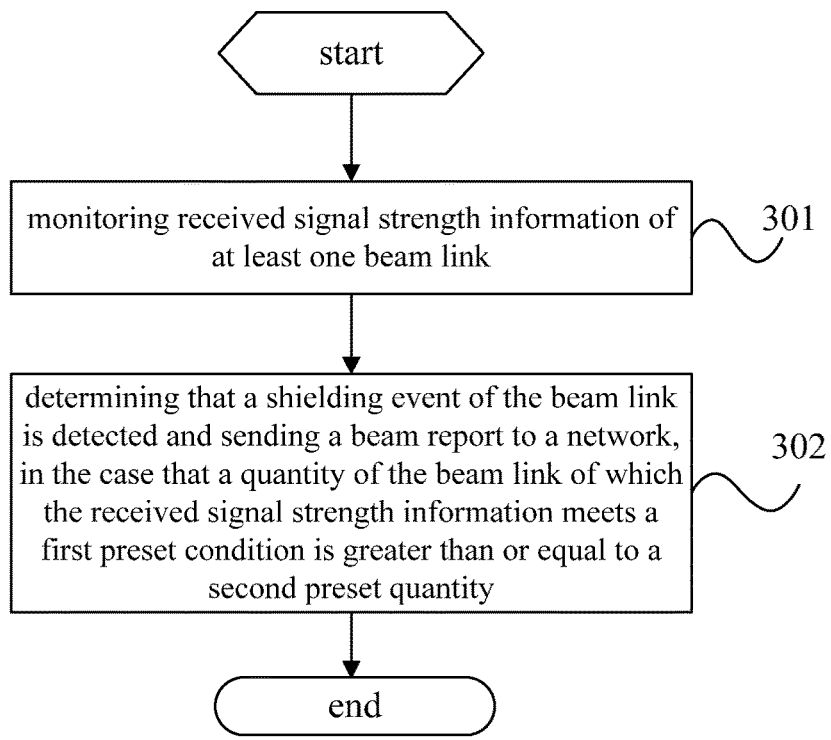
FIG. 3 is a second flowchart of a method of sending a beam report in an embodiment of the present disclosure.

As shown in FIG. 3, a method of sending a beam report is further provided in an embodiment of the present disclosure, which is applied to a terminal and includes:

Step 301: monitoring received signal strength information of at least one beam link.

In this step, the received signal strength information of the beam link includes a Received Signal Strength Indicator (RSSI) of the beam link. The RSSI of the beam link can be measured by the terminal in real time, and it is not limited to any measurement timing. Therefore, by monitoring the RSSI of the beam link, the monitoring of the beam link may be more real-time and it is able to detect the shielding events as early as possible.

Step 302: determining that a shielding event of the beam link is detected and sending a beam report to a network, in the case that a quantity of the beam link of which the received signal strength information meets a first preset condition is greater than or equal to a second preset quantity. Specifically, when the received signal strength information is less than a fourth preset threshold, the received signal strength information meets the first preset condition.

The beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

In this step, the second preset quantity is a preset value. For example, the second preset quantity is two, that is, it is detected that the received signal strength information of the two beam links meets the first preset condition, and then it is determined that a shielding event occurs on the beam link, and then a beam report is triggered to the network. The network may perform a fast beam switching based on the beam report and resume the data transmission, thereby improving the reliability of data transmission.

It should be noted that in the above embodiments of the present disclosure, parameters such as the second preset quantity, the fourth preset threshold value, the first preset condition, the quantity of monitored beam links, and the like may be pre-agreed by a protocol, or configured by the network, or determined by the terminal itself, which are not specifically limited here.

Specifically, the third indication information included in the beam report reported by the terminal may be indicated by using a 1-bit indication bit. For example, in the case that the indication bit is "1", it indicates that the beam link is shielded, and when the indication bit is "0", it indicates that no shielding event has occurred on the beam link. The fourth indication information included in the beam report reported by the terminal is used to indicate the reason why the terminal sends the beam report, such as a shielding event on the beam link or damage to the beam link.

Further, in the above embodiments of the present disclosure, the method further includes:

in the case that a downlink reference signal sent by the network is received on the beam link when monitoring the received signal strength information of the beam link, acquiring a RSRP of the beam link;

The corresponding step 302 includes:

determining that the shielding event of the beam link is detected and sending the beam report to the network, in the case that the quantity of the beam link of which the received signal strength information meets the first preset condition is greater than or equal to a second preset quantity and a quantity of the beam link of which the RSRP is less than a third preset threshold value is greater than or equal to a third preset quantity.

It should be noted that the second preset quantity and the third preset quantity are integers greater than or equal to 1, which may be determined by a protocol, a network configuration, or a terminal.

As shown in FIG. 2, two sending and receiving points on the network side are connected to the terminal. The user holds the first antenna panel of the terminal during use. Due to holding the terminal, the average value of multiple measurements of the RSSI of the beam link between transmission beam 1 and reception beam 1 measured by the terminal within a preset time period configured by the network is lower than a preset threshold RSSIth, and a shielding event occurs on the beam link between the transmission beam 1 and the reception beam 1. The terminal uses a beam report to tell the network that a shielding event occurs on a beam link between transmission beam 1 and reception beam 1, and the network switches to the beam link between transmission beam 2 and reception beam 2 based on the beam report.

It should be noted that when the terminal measures the RSSI of the beam link, it does not need to be based on the downlink reference signal sent by the network, but in the case that the terminal happens to receive the downlink reference signal sent by the network when measuring the RSSI of the beam link, the terminal may obtain the RSRP of the beam link based on the downlink reference signal and the terminal may comprehensively determine whether a shielding event occurs on the beam link based on the RSSI and the RSRP of the beam link.

Further, step 202 in the above embodiment of the present disclosure includes:

sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by an MAC CE.

Specifically, the resource where the beam report is located may be any one of the following resources:

1. reserved resources configured by the network for the terminal through a high-level signaling;

2. a resource through which the terminal reports a periodic beam report, i.e., the resource of the periodic beam report multiplexed by the beam report in the embodiment of the present disclosure;

3. a resource through which the terminal transmits a beam failure recovery request, i.e., a resource for a beam failure recovery request of a beam failure recovery mechanism multiplexed by the beam report in the embodiment of the present disclosure;

4. a first uplink resource scheduled by the network for the terminal after the shielding event of the target antenna panel is detected, where in the case that the target resource is the first uplink resource scheduled by the network for the terminal in the case that the shielding event of the target antenna panel is detected, the terminal carries the beam report by a Medium Access Control Control Element (MAC CE).

The use of any of the foregoing resources may make the beam report in the embodiment of the present disclosure to be compatible with the periodically reported beam report in the related art, thereby improving the application range of the method of transmission beam report in the embodiment of the present disclosure, and reducing the modification of the method of periodically reporting the beam report in the related art, so as to save costs.

Further, in the above embodiment of the present disclosure, the beam report further includes:

identity information of a downlink transmission beam of at least one beam link recommended by the terminal to be switched to by the network.

It should be noted that in the above embodiments of the present disclosure, the quality parameter of the at least one beam link recommended by the terminal to be switched to by the network also need to meet the data transmission requirements, for example, the quality parameter of at least one beam link recommended by the terminal to be switched to by the network is greater than or equal to a preset value. Generally, the beam link recommended by the terminal to be switched to by the network is one or more beam links with better quality parameter.

Further, in the foregoing embodiment of the present disclosure, the beam report further includes: a RSRP of the downlink transmission beam of the at least one beam link recommended by the terminal to be switched to by the network.

Following the above example, the method described in the above embodiment of the present disclosure further includes:

in the case that a downlink reference signal sent by the network is received on the at least one beam link to be switched to by the network when monitoring the received signal strength information of the at least one beam link recommended by the terminal to be switched to by the network, acquiring, according to the downlink reference signal, the RSRP of the at least one beam link to be switched to by the network, where the RSRP of the beam link is measured based on a downlink reference signal; in the case that a downlink reference signal is received on the beam link, the RSRP of the beam link may be directly measured.

In the case that the downlink reference signal sent by the network is not received on the at least one beam link to be switched to by the network when monitoring the received signal strength information of the at least one beam link recommended by the terminal to be switched to by the network, estimating the RSRP of the at least one beam link to be switched to by the network, according to a RSRP of the at least one beam link to be switched to by the network which is acquired in a last measurement and a power attenuation of the at least one beam link to be switched to by the network which is measured by the terminal. In the case that no downlink reference signal is received on the beam link, the RSRP of the beam link at this time may be estimated.

The estimation method is as follows: the RSRP of the beam link obtained by the terminal's previous measurement, and the power attenuation caused by the shielding event of the beam link measured by the terminal. Specifically, the power attenuation measurement method includes the measurement method by the received signal RSSI or the measurement method by the echo reflection, and through these measurement methods, the terminal may estimate the power attenuation caused by the beam link shielding. For example, the power attenuation is 20 dB after the shielding, and then the possible RSRP measured at this time is calculated based on the RSRP of the beam link measured at the last time and 20 dB.

It should be noted that the content contained in the beam report can be used as reference data when the network performs the beam switching. The network does not necessarily select the downlink transmission beam from the beam link recommended by the terminal, and the network can also perform beam training to determine the downlink transmission beam. The network needs to inform the terminal of the downlink transmission beam it has selected after determining the downlink transmission beam, so that the terminal may select a suitable reception beam for data transmission. The embodiment of the present disclosure does not limit the behavior of the network side.

Further, in the foregoing embodiment of the present disclosure, in order to improve the accuracy of the determination that the received signal strength information of the beam link meets the first preset condition, after step 301, the method further includes:

acquiring a plurality of received signal strength information of the beam link detected within a preconfigured preset time period or within a preset time period configured by a network;

acquiring a statistical average of the plurality of received signal strength information; and in the case that the statistical average is less than a fifth preset threshold value, determining that the received signal strength information of the beam link meet the first preset condition.

Since there may be a large error in the received signal strength information of the beam link obtained in real time, in the embodiment of the present disclosure, an average value of multiple received signal strength information is obtained by counting multiple received signal strength information of the same beam link in a preset time period, and then the average value is taken as the received signal strength information of the beam link in a preset time period, thereby improving the accuracy of the received signal strength information; and determining whether the received signal strength information of the beam link meets the first present condition based on the received signal strength information of the beam link in the preset time period, thereby further improving the accuracy of the determination.

It should be noted that the fifth preset threshold value and the fourth preset threshold value may be the same or different; the fourth preset threshold value and the fifth preset threshold value may also be pre-agreed by a protocol, or configured by the network, or determined by the terminal itself, which are not specifically limited here.

In summary, in the foregoing embodiments of the present disclosure, the terminal determines whether a shielding event occurs on the beam link according to the received signal strength information of the beam link, and can timely detect the shielding event of the beam link and trigger aperiodic reporting of the beam report. The received signal strength information of the beam link can be measured by the terminal when there is no reference signal, so the terminal can detect the beam link shielding event as early as possible, so that the network side can learn the shielding event earlier and perform a fast beam switching with the terminal, restore data transmission, thereby improving the reliability of data transmission. In addition, once the terminal finds a shielding event, it does not need to wait for the resources for the periodic beam report to report, but performs an aperiodic reporting, so that the network can learn and switch the beam as soon as possible. Through the content reported by the terminal, the network can learn that a shielding event has occurred, determine the beam switching and which beam to switch to, thereby quickly recovering data transmission and improving the stability of data transmission.

Figure 4:
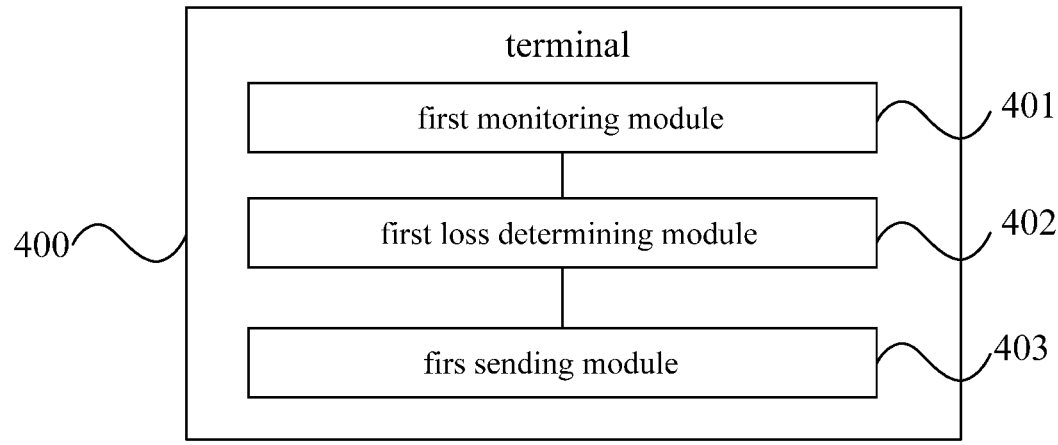
FIG. 4 is a first schematic view of a terminal in an embodiment of the present disclosure.

As shown in FIG. 4, a terminal 400 is further provided in an embodiment of the present disclosure, including:

a first monitoring module 401, configured to monitor a quality parameter of at least one beam link; and a first loss determining module 402, configured to determine, according to the quality parameter of the beam link, at least one beam link subjected to a quality loss;

a first sending module 403, configured to: in the case that at least a first preset quantity of beam link of the at least one beam link subjected to the quality loss is the beam link of a target antenna panel, determine that a shielding event of the target antenna panel is detected and send a beam report to a network;

where the beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

Optionally, the quality parameter of the beam link includes: a Received Signal Strength Indicator (RSSI) of the beam link and/or a Reference Signal Received Power (RSRP) of the beam link.

Figure 5:
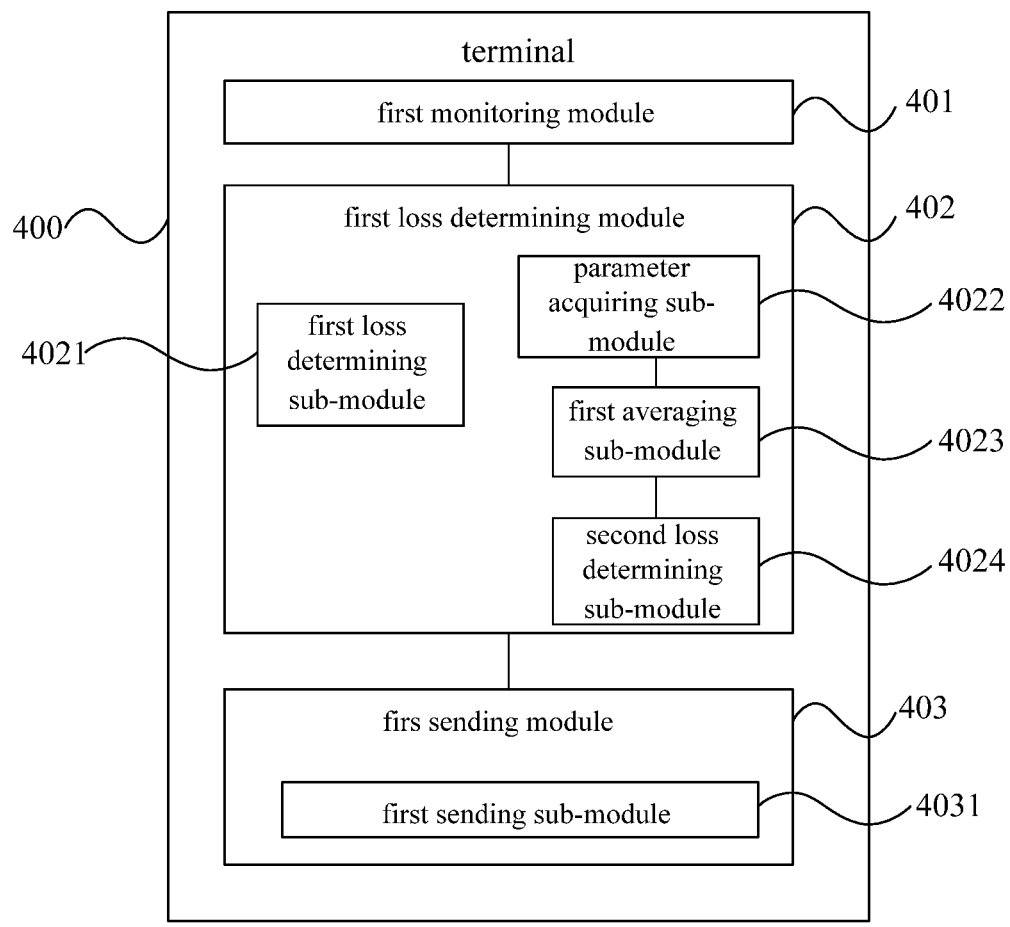
FIG. 5 is a second schematic view of a terminal in an embodiment of the present disclosure.

Optionally, as shown in FIG. 5, the first loss determining module 402 includes:

a first loss determining sub-module 4021, configured to: in the case that the quality parameter of the beam link is less than a first preset threshold, determine that the beam link is subjected to the quality loss.

Optionally, as shown in FIG. 5, the first sending module 403 includes:

a first sending sub-module 4031, configured to send the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes:

identity information of a downlink transmission beam of at least one beam link recommended by the terminal to be switched to by the network, where the at least one beam link recommended by the terminal to be switched to by the network is a beam link corresponding to an antenna panel other than the target antenna panel.

Optionally, the beam report further includes: a RSRP of the downlink transmission beam of the at least one beam link recommended by the terminal to be switched to by the network.

Optionally, as shown in FIG. 5, the first loss determining module 402 includes:

a parameter acquiring sub-module 4022, configured to acquire a plurality of quality parameters of the beam link detected within a preconfigured preset time period or within a preset time period configured by a network;

a first averaging sub-module 4023, configured to acquire a statistical average of the plurality of quality parameters; and a second loss determining sub-module 4024, configured to: in the case that the statistical average is less than a second preset threshold value, determine that the beam link is subjected to the quality loss.

In summary, according to the foregoing embodiments of the present disclosure, the terminal determines whether a shielding event occurs on an antenna panel according to the quantity of beam links subjected the quality loss on the antenna panel, and triggers a beam report to the network when the shielding event occurs on the antenna panel, so that the network may know that a shielding event occurs on the target antenna panel, so that the network may switch to the beam link corresponding to the antenna panel where no shielding event has occurred, so as to perform data transmission, thereby improving the reliability of data transmission.

It should be noted that the terminal in the embodiment of the present disclosure is a terminal capable of executing the above-mentioned method of sending beam report, and all the embodiments of the above-mentioned method of sending beam report are applicable to the terminal and can achieve the same beneficial effects.

A terminal is provided in the present disclosure, including a memory, a processor and a computer program stored in the memory and executable on the processor, where the computer program is executed by the processor to perform the method of sending a beam report hereinabove, and can achieve the same technical effect. To avoid repetition, details are not repeated here.

A computer-readable storage medium is provided in the present disclosure, where a computer program in the computer-readable storage medium, where the computer program is executed by a processor to perform the method of sending a beam report hereinabove, and can achieve the same technical effects. To avoid repetition, it will not be repeated here. The computer-readable storage medium includes a read-only memory (ROM), a random access memory (RAM), a magnetic disk or an optical disk.

Figure 6:
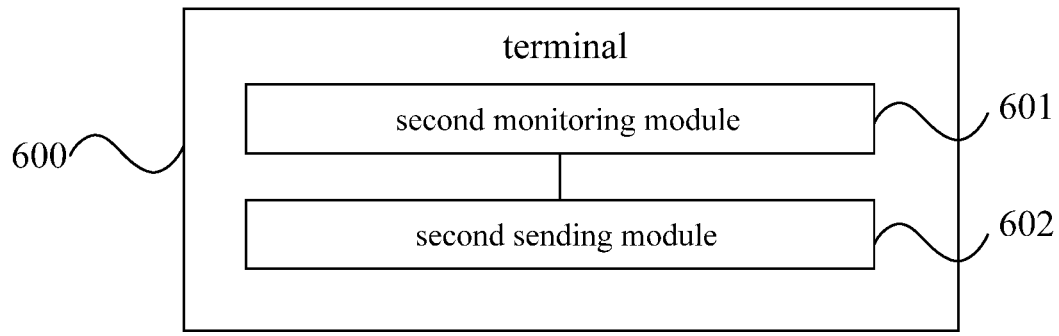
FIG. 6 is a third schematic view of a terminal in an embodiment of the present disclosure.

As shown in FIG. 6, a terminal 600 is further provided in an embodiment of the present disclosure, including:

a second monitoring module 601, configured to monitor received signal strength information of at least one beam link;

a second sending module 602, configured to: determine that a shielding event of the beam link is detected and send a beam report to a network, in the case that a quantity of the beam link of which the received signal strength information meets a first preset condition is greater than or equal to a second preset quantity; where the beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

Optionally, the received signal strength information of the beam link includes a Received Signal Strength Indicator (RSSI) of the beam link.

Figure 7:
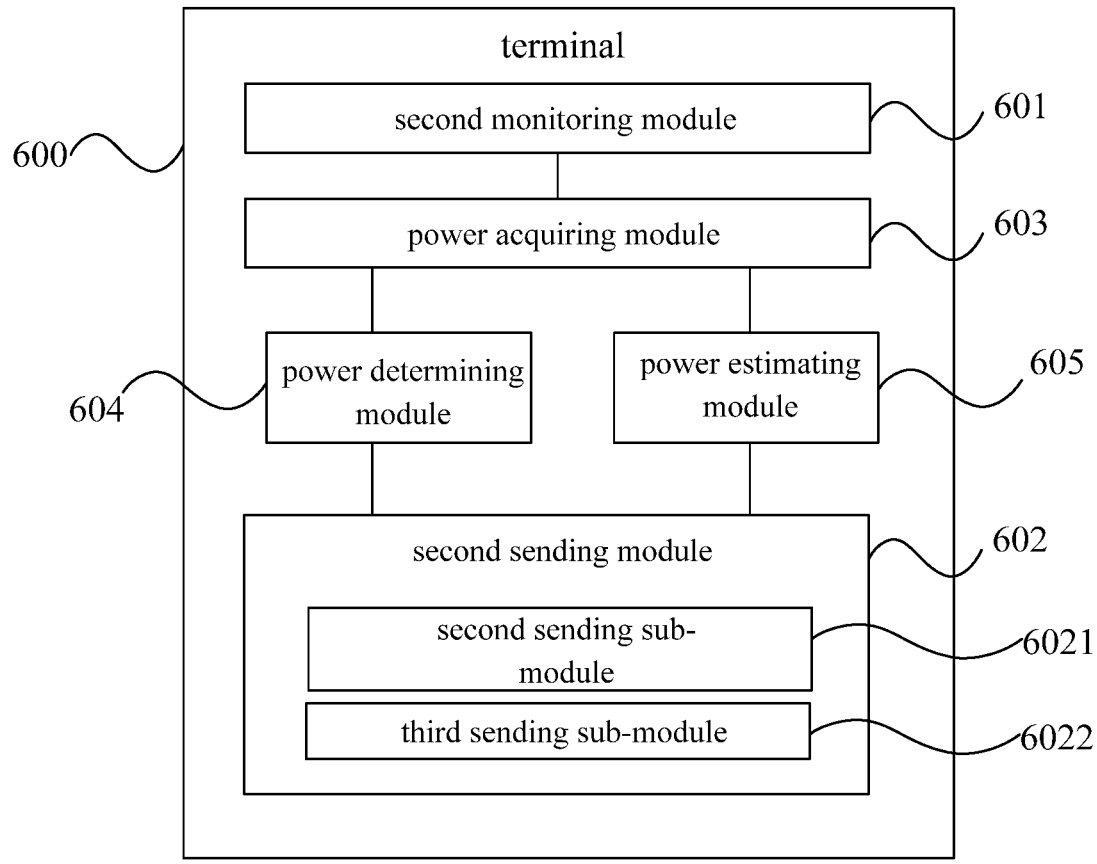
FIG. 7 is a fourth schematic view of a terminal in an embodiment of the present disclosure.

Optionally, as shown in FIG. 7, the terminal further includes:

a power acquiring module 603, configured to: in the case that a downlink reference signal sent by the network is received on the beam link when monitoring the received signal strength information of the beam link, acquire a Reference Signal Received Power (RSRP) of the beam link;

the second sending module 602 includes:

a second sending sub-module 6021, configured to: determine that the shielding event of the beam link is detected and send the beam report to the network, in the case that the quantity of the beam link of which the received signal strength information meets the first preset condition is greater than or equal to a second preset quantity and a quantity of the beam link of which the RSRP is less than a third preset threshold value is greater than or equal to a third preset quantity.

Optionally, in the case that the received signal strength information is less than a fourth preset threshold value, the received signal strength information meets the first preset condition.

Optionally, the second sending module 602 includes:

a third sending sub-module 6022, configured to send the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes:

identity information of a downlink transmission beam of at least one beam link recommended by the terminal to be switched to by the network.

Optionally, the beam report further includes: a RSRP of the at least one beam link recommended by the terminal to be switched to by the network.

Optionally, as shown in FIG. 7, the terminal further includes:

a power determining module 604, configured to: in the case that a downlink reference signal sent by the network is received on the at least one beam link to be switched to by the network when monitoring the received signal strength information of the at least one beam link recommended by the terminal to be switched to by the network, acquire, according to the downlink reference signal, the RSRP of the at least one beam link to be switched to by the network;

a power estimating module 605, configured to: in the case that the downlink reference signal sent by the network is not received on the at least one beam link to be switched to by the network when monitoring the received signal strength information of the at least one beam link recommended by the terminal to be switched to by the network, estimate the RSRP of the at least one beam link to be switched to by the network, according to a RSRP of the at least one beam link to be switched to by the network which is acquired in a last measurement and a power attenuation of the at least one beam link to be switched to by the network which is measured by the terminal.

Optionally, the terminal further includes:

an information acquiring module, configured to acquire a plurality of received signal strength information of the beam link detected within a preconfigured preset time period or within a preset time period configured by a network;

a statistical averaging module, configured to acquire a statistical average of the plurality of received signal strength information; and a determining module, configured to: in the case that the statistical average is less than a fifth preset threshold value, determine that the received signal strength information of the beam link meet the first preset condition.

In summary, in the foregoing embodiments of the present disclosure, the terminal determines whether a shielding event occurs on the beam link according to the received signal strength information of the beam link, and can timely detect the shielding event of the beam link and trigger aperiodic reporting of the beam report. The received signal strength information of the beam link can be measured by the terminal when there is no reference signal, so the terminal can detect the beam link shielding event as early as possible, so that the network side can learn the shielding event earlier and perform a fast beam switching with the terminal, restore data transmission, thereby improving the reliability of data transmission. In addition, once the terminal finds a shielding event, it does not need to wait for the resources for the periodic beam report to report, but performs an aperiodic reporting, so that the network can learn and switch the beam as soon as possible. Through the content reported by the terminal, the network can learn that a shielding event has occurred, determine the beam switching and which beam to switch to, thereby quickly recovering data transmission and improving the stability of data transmission.

It should be noted that the terminal in the embodiment of the present disclosure is a terminal capable of executing the above-mentioned method of sending beam report, and all the embodiments of the above-mentioned method of sending beam report are applicable to the terminal and can achieve the same beneficial effects.

A terminal is provided in the present disclosure, including a memory, a processor and a computer program stored in the memory and executable on the processor, where the computer program is executed by the processor to perform the method of sending a beam report hereinabove, and can achieve the same technical effect. To avoid repetition, details are not repeated here.

A computer-readable storage medium is provided in the present disclosure, where a computer program in the computer-readable storage medium, where the computer program is executed by a processor to perform the method of sending a beam report hereinabove, and can achieve the same technical effects. To avoid repetition, it will not be repeated here. The computer-readable storage medium includes a read-only memory (ROM), a random access memory (RAM), a magnetic disk or an optical disk.

Figure 8:
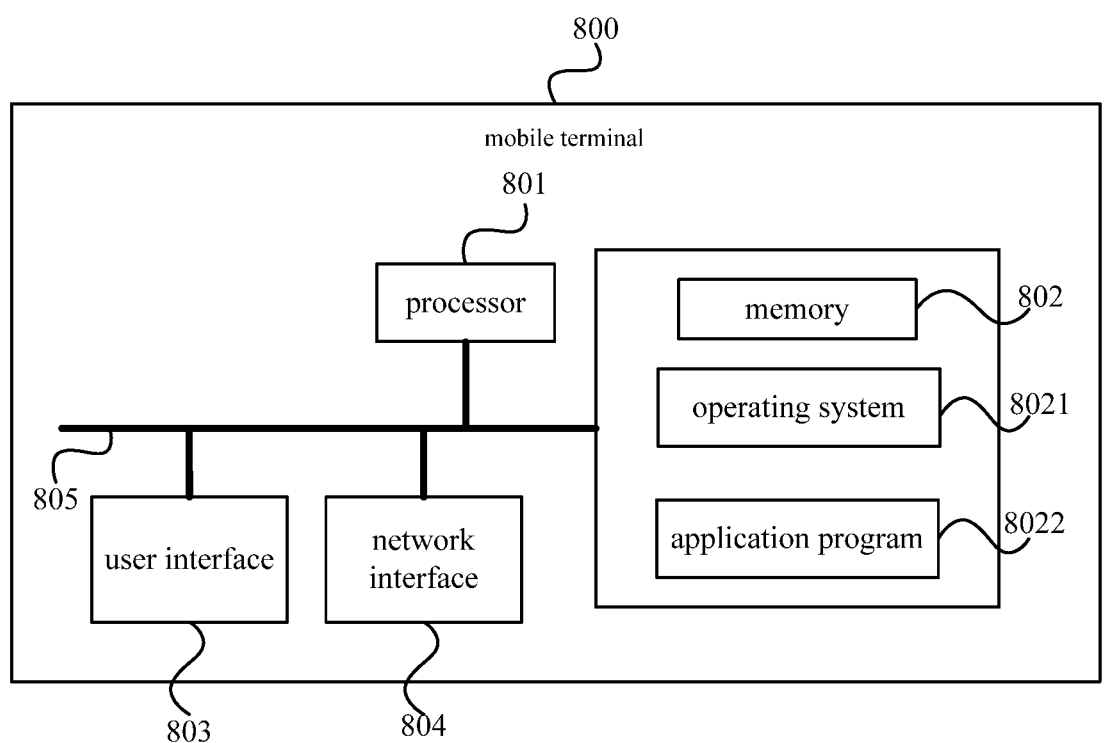
FIG. 8 is a fifth schematic view of a terminal in an embodiment of the present disclosure.

FIG. 8 is another schematic view of a terminal in an embodiment of the present disclosure. The terminal 800 shown in FIG. 8 includes: at least one processor 801, a memory 802, at least one network interface 804, and other user interfaces 803. The various components in the terminal 800 are coupled together through a bus system 805. It can be understood that the bus system 805 is used to implement connection and communication between these components. The bus system 805 includes a power bus, a control bus, and a status signal bus in addition to the data bus. However, for the sake of clarity, various buses are marked as the bus system 805 in FIG. 8.

The user interface 803 may include a display, a keyboard, or a pointing device (for example, a mouse, a trackball, a touch pad, or a touch screen).

It can be understood that the memory 802 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (SDRAM), double data rate synchronous dynamic random access memory (DDRSDRAM), enhanced synchronous dynamic random access memory (ESDRAM), synchronous connection dynamic random access memory (Synch link DRAM, SLDRAM) and direct memory bus random access memory (Direct Ram bus RAM, DRRAM). The memory 802 of the systems and methods described herein is intended to include, but is not limited to, these and any other suitable types of memory.

In some embodiments, the memory 802 stores the following elements, executable modules or data structures, or a subset of them, or their extended set: an operating system 8021 and an application program 8022.

The operating system 8021 includes various system programs, such as a framework layer, a core library layer, and a driver layer, etc., for implementing various basic services and processing hardware-based tasks. The application program 8022 includes various application programs, such as a media player and a browser, and is used to implement various application services. A program for implementing the method of the embodiment of the present disclosure may be included in an application program 8022.

In the embodiment of the present disclosure, the mobile terminal 800 further includes: a computer program stored on the memory 802 and executable on the processor 801. When the computer program is executed by the processor 801, the following steps are implemented: monitoring a quality parameter of at least one beam link; and determining, according to the quality parameter of the beam link, at least one beam link subjected to a quality loss; in the case that at least a first preset quantity of beam link of the at least one beam link subjected to the quality loss is the beam link of a target antenna panel, determining that a shielding event of the target antenna panel is detected and sending a beam report to a network; where the beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

The method disclosed in the foregoing embodiment of the present disclosure may be applied to the processor 801, or implemented by the processor 801. The processor 801 may be an integrated circuit chip and has a signal processing capability. In the implementation process, each step of the above method may be completed by an integrated logic circuit of hardware in the processor 801 or an instruction in the form of software. The processor 801 may be a general-purpose processor, a digital signal processor (DSP), an application specific integrated circuit (ASIC), a Field Programmable Gate Array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 802, and the processor 801 reads information in the memory 802 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), and programmable logic device (PLD), Field-Programmable Gate Array (FPGA), general-purpose processor, controller, microcontroller, microprocessor, and other electronic units for performing the functions described in this application or a combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, the quality parameter of the beam link includes: a Received Signal Strength Indicator (RSSI) of the beam link and/or a Reference Signal Received Power (RSRP) of the beam link.

Optionally, the computer program is executed by the processor 801 to perform: in the case that the quality parameter of the beam link is less than a first preset threshold, determining that the beam link is subjected to the quality loss.

Optionally, the computer program is executed by the processor 801 to perform: sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes: identity information of a downlink transmission beam of at least one beam link recommended by the terminal to be switched to by the network, where the at least one beam link recommended by the terminal to be switched to by the network is a beam link corresponding to an antenna panel other than the target antenna panel.

Optionally, the beam report further includes: a RSRP of the downlink transmission beam of the at least one beam link recommended by the terminal to be switched to by the network.

Optionally, the computer program is executed by the processor 801 to perform: acquiring a plurality of quality parameters of the beam link detected within a preconfigured preset time period or within a preset time period configured by a network; acquiring a statistical average of the plurality of quality parameters; and in the case that the statistical average is less than a second preset threshold value, determining that the beam link is subjected to the quality loss.

The terminal 800 can implement the processes implemented by the terminal in the foregoing embodiments. To avoid repetition, details are not described herein again.

In summary, in the foregoing embodiments of the present disclosure, the terminal determines whether a shielding event occurs on the antenna panel according to the quantity of beam links that have suffered mass loss on the same antenna panel, and triggers a beam report to the network when the shielding event occurs on the antenna panel, so that the network can know that a shielding event occurs on the target antenna panel, so that the network can switch to the beam link corresponding to the antenna panel where no shielding event has occurred to perform data transmission, thereby improving the reliability of data transmission.

It should be noted that the terminal in the embodiment of the present disclosure is a terminal capable of executing the above-mentioned beam report sending method, and all the embodiments of the above-mentioned beam report sending method are applicable to the terminal and can achieve the same beneficial effects.

Figure 9:
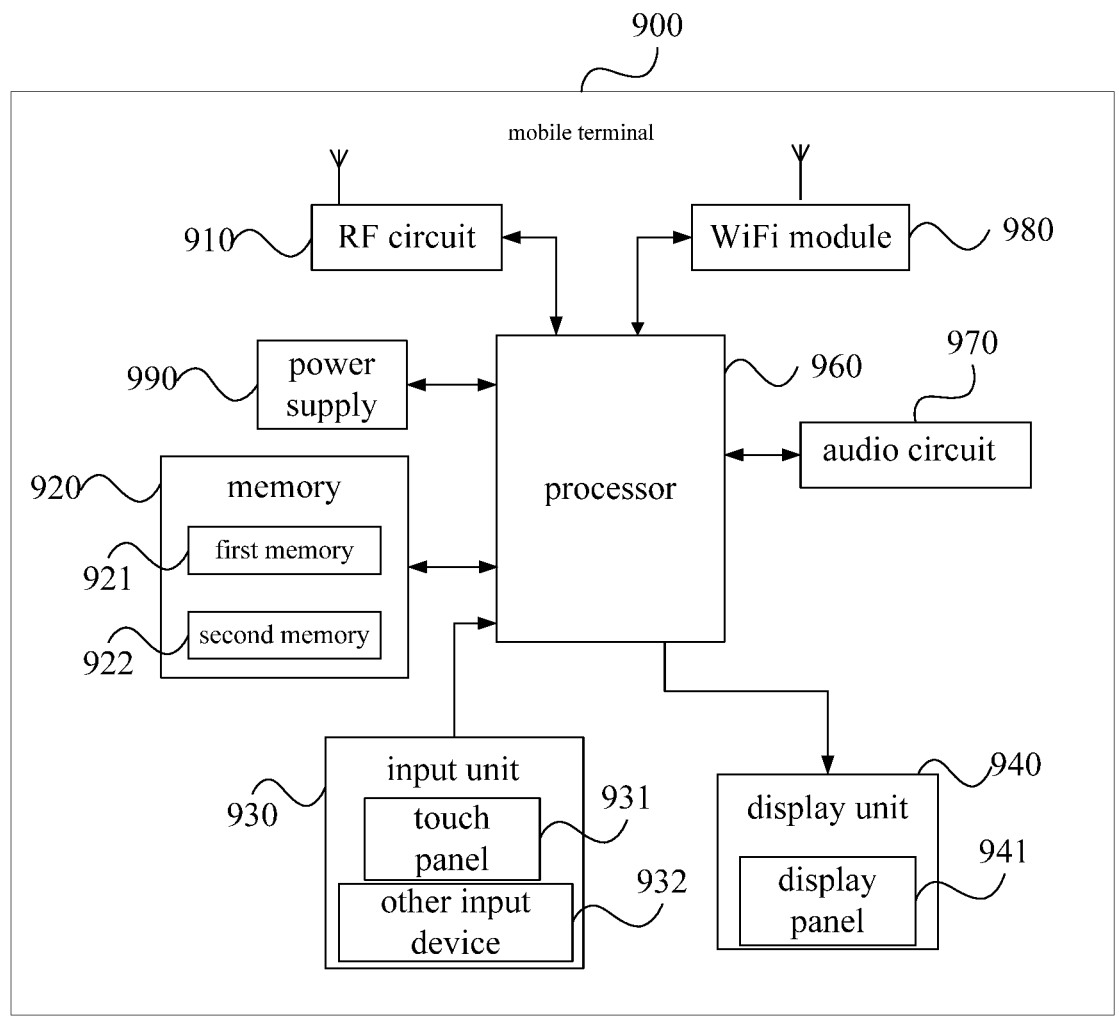
FIG. 9 is a sixth schematic view of a terminal in an embodiment of the present disclosure.

FIG. 9 is another schematic structural diagram of a terminal in an embodiment of the present disclosure. Specifically, the terminal 900 in FIG. 9 may be a mobile phone, a tablet computer, a Personal Digital Assistant (PDA), or a vehicle-mounted computer.

The terminal 900 in FIG. 9 includes a radio frequency (RF) circuit 910, a memory 920, an input unit 930, a display unit 940, a processor 960, an audio circuit 970, a Wi Fi module 980, and a power supply 990.

The input unit 930 may be configured to receive digital or character information input by a user, and generate signal inputs related to user settings and function control of the terminal 900. Specifically, in the embodiment of the present disclosure, the input unit 930 may include a touch panel 931. The touch panel 931, also known as a touch screen, can collect user's touch operations on or near it (such as the operation of the user on the touch panel 931 using any suitable object or accessory such as a finger, a stylus pen), and according to the preset settings A specific program drives the corresponding connected device. Optionally, the touch panel 931 may include a touch detection device and a touch controller. Among them, the touch detection device detects the user's touch position, and detects the signal brought by the touch operation, and transmits the signal to the touch controller; the touch controller receives touch information from the touch detection device, converts it into contact coordinates, and sends it. The processor 960 can receive commands from the processor 960 and execute them. In addition, various types such as resistive, capacitive, infrared, and surface acoustic wave can be used to implement the touch panel 931. In addition to the touch panel 931, the input unit 930 may also include other input devices 932. Other input devices 932 may include one or more of, but are not limited to, a physical keyboard, function keys (such as volume control keys, switch keys, etc.), trackball, mouse, joystick, etc.

The display unit 940 may be configured to display information input by the user or information provided to the user and various menu interfaces of the terminal 900. The display unit 940 may include a display panel 941. Optionally, the display panel 941 may be configured in the form of an LCD or an Organic Light-Emitting Diode (OLED).

It should be noted that the touch panel 931 may cover the display panel 941 to form a touch display screen. When the touch display screen detects a touch operation on or near the touch display screen, it is transmitted to the processor 960 to determine the type of the touch event. The 960 provides corresponding visual output on the touch display according to the type of touch event.

The touch display includes an application program interface display area and commonly used controls display area. The arrangement manners of the display area of the application program interface and the display area of the commonly used controls are not limited, and may be an arrangement manner for distinguishing the two display areas, such as an up-down arrangement, an left-right arrangement, and the like. The application program interface display area can be used to display the interface of the application program. Each interface may include interface elements such as at least one application icon and/or widget desktop control. The application program interface display area can also be an empty interface without any content. This common control display area is used to display controls with high usage, such as setting buttons, interface numbers, scroll bars, application icons such as phonebook icons, and so on.

The processor 960 is the control center of the terminal 900, and uses various interfaces and lines to connect various parts of the entire mobile phone. By running or executing software programs and/or modules stored in the first memory 921, and calling stored in the second memory The data in 922 performs various functions of the terminal 900 and processes the data, thereby performing overall monitoring of the terminal 900. Optionally, the processor 960 may include one or more processing units.

In the embodiment of the present disclosure, the mobile terminal 900 further includes: a computer program stored in the memory 920 and executable on the processor 960. When the computer program is executed by the processor 960, the following steps are implemented: monitoring a quality parameter of at least one beam link; and determining, according to the quality parameter of the beam link, at least one beam link subjected to a quality loss; in the case that at least a first preset quantity of beam link of the at least one beam link subjected to the quality loss is the beam link of a target antenna panel, determining that a shielding event of the target antenna panel is detected and sending a beam report to a network; where the beam report includes one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss, and second indication information indicating a reason why the terminal sends the beam report.

Optionally, the quality parameter of the beam link includes: a Received Signal Strength Indicator (RSSI) of the beam link and/or a Reference Signal Received Power (RSRP) of the beam link.

Optionally, the computer program is executed by the processor 960 to perform: in the case that the quality parameter of the beam link is less than a first preset threshold, determining that the beam link is subjected to the quality loss.

Optionally, the computer program is executed by the processor 960 to perform: sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes: identity information of a downlink transmission beam of at least one beam link recommended by the terminal to be switched to by the network, where the at least one beam link recommended by the terminal to be switched to by the network is a beam link corresponding to an antenna panel other than the target antenna panel.

Optionally, the beam report further includes: a RSRP of the downlink transmission beam of the at least one beam link recommended by the terminal to be switched to by the network.

Optionally, the computer program is executed by the processor 960 to perform: acquiring a plurality of quality parameters of the beam link detected within a preconfigured preset time period or within a preset time period configured by a network; acquiring a statistical average of the plurality of quality parameters; and in the case that the statistical average is less than a second preset threshold value, determining that the beam link is subjected to the quality loss.

In summary, in the foregoing embodiments of the present disclosure, the terminal determines whether a shielding event occurs on the antenna panel according to the quantity of beam links that have suffered mass loss on the same antenna panel, and triggers a beam report to the network when the shielding event occurs on the antenna panel, so that the network can know that a shielding event occurs on the target antenna panel, so that the network can switch to the beam link corresponding to the antenna panel where no shielding event has occurred to perform data transmission, thereby improving the reliability of data transmission.

It should be noted that the terminal in the embodiment of the present disclosure is a terminal capable of executing the above-mentioned beam report sending method, and all the embodiments of the above-mentioned beam report sending method are applicable to the terminal and can achieve the same beneficial effects.

FIG. 8 is another schematic view of a terminal in an embodiment of the present disclosure. The terminal 800 shown in FIG. 8 includes: at least one processor 801, a memory 802, at least one network interface 804, and other user interfaces 803. The various components in the terminal 800 are coupled together through a bus system 805. It can be understood that the bus system 805 is used to implement connection and communication between these components. The bus system 805 includes a power bus, a control bus, and a status signal bus in addition to the data bus. However, for the sake of clarity, various buses are marked as the bus system 805 in FIG. 8.

The user interface 803 may include a display, a keyboard, or a pointing device (for example, a mouse, a trackball, a touch pad, or a touch screen).

It can be understood that the memory 802 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous connection dynamic random access memory (Synch link DRAM, SLDRAM) And direct memory bus random access memory (Direct Ram bus RAM, DRRAM). The memory 802 of the systems and methods described herein is intended to include, but is not limited to, these and any other suitable types of memory.

In some embodiments, the memory 802 stores the following elements, executable modules or data structures, or a subset of them, or their extended set: an operating system 8021 and an application program 8022.

Among them, the operating system 8021 includes various system programs, such as a framework layer, a core library layer, and a driver layer, etc., for implementing various basic services and processing hardware-based tasks. The application program 8022 includes various application programs, such as a media player and a browser, and is used to implement various application services. A program for implementing the method of the embodiment of the present disclosure may be included in an application program 8022.

In the embodiment of the present disclosure, the mobile terminal 800 further includes: a computer program stored on the memory 802 and executable on the processor 801. When the computer program is executed by the processor 801, the following steps are implemented: monitoring received signal strength information of at least one beam link; determining that a shielding event of the beam link is detected and sending a beam report to a network, in the case that a quantity of the beam link of which the received signal strength information meets a first preset condition is greater than or equal to a second preset quantity; where the beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

The method disclosed in the foregoing embodiment of the present disclosure may be applied to the processor 801, or implemented by the processor 801. The processor 801 may be an integrated circuit chip and has a signal processing capability. In the implementation process, each step of the above method may be completed by an integrated logic circuit of hardware in the processor 801 or an instruction in the form of software. The processor 801 may be a general-purpose processor, a digital signal processor (DSP), an application specific integrated circuit (ASIC), a Field Programmable Gate Array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 802, and the processor 801 reads information in the memory 802 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), and Programmable Logic Device (PLD), Field-Programmable Gate Array (FPGA), general-purpose processor, controller, microcontroller, microprocessor, and other electronic units for performing the functions described in this application Or a combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, the received signal strength information of the beam link includes a Received Signal Strength Indicator (RSSI) of the beam link.

Optionally, the computer program is executed by the processor 801 to perform: in the case that a downlink reference signal sent by the network is received on the beam link when monitoring the received signal strength information of the beam link, acquiring a Reference Signal Received Power (RSRP) of the beam link; and determining that the shielding event of the beam link is detected and sending the beam report to the network, in the case that the quantity of the beam link of which the received signal strength information meets the first preset condition is greater than or equal to a second preset quantity and a quantity of the beam link of which the RSRP is less than a third preset threshold value is greater than or equal to a third preset quantity.

Optionally, in the case that the received signal strength information is less than a fourth preset threshold value, the received signal strength information meets the first preset condition.

Optionally, the computer program is executed by the processor 801 to perform: sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes: identity information of a downlink transmission beam of at least one beam link recommended by the terminal to be switched to by the network.

Optionally, the beam report further includes: a RSRP of the at least one beam link recommended by the terminal to be switched to by the network.

Optionally, the computer program is executed by the processor 801 to perform: in the case that a downlink reference signal sent by the network is received on the at least one beam link to be switched to by the network when monitoring the received signal strength information of the at least one beam link recommended by the terminal to be switched to by the network, acquiring, according to the downlink reference signal, the RSRP of the at least one beam link to be switched to by the network; in the case that the downlink reference signal sent by the network is not received on the at least one beam link to be switched to by the network when monitoring the received signal strength information of the at least one beam link recommended by the terminal to be switched to by the network, estimating the RSRP of the at least one beam link to be switched to by the network, according to a RSRP of the at least one beam link to be switched to by the network which is acquired in a last measurement and a power attenuation of the at least one beam link to be switched to by the network which is measured by the terminal.

Optionally, the computer program is executed by the processor 801 to perform: acquiring a plurality of received signal strength information of the beam link detected within a preconfigured preset time period or within a preset time period configured by a network; acquiring a statistical average of the plurality of received signal strength information; and in the case that the statistical average is less than a fifth preset threshold value, determining that the received signal strength information of the beam link meet the first preset condition. The terminal 800 can implement the processes implemented by the terminal in the foregoing embodiments. To avoid repetition, details are not described herein again.

In summary, in the foregoing embodiments of the present disclosure, the terminal determines whether a shielding event occurs on the beam link according to the received signal strength information of the beam link, and can timely detect the shielding event of the beam link and trigger aperiodic reporting of the beam report. The received signal strength information of the beam link can be measured by the terminal when there is no reference signal, so the terminal can detect the beam link shielding event as early as possible, so that the network side can learn the shielding event earlier and perform a fast beam switching with the terminal, restore data transmission, thereby improving the reliability of data transmission. In addition, once the terminal finds a shielding event, it does not need to wait for the resources for the periodic beam report to report, but performs an aperiodic reporting, so that the network can learn and switch the beam as soon as possible. Through the content reported by the terminal, the network can learn that a shielding event has occurred, determine the beam switching and which beam to switch to, thereby quickly recovering data transmission and improving the stability of data transmission.

It should be noted that the terminal in the embodiment of the present disclosure is a terminal capable of executing the above-mentioned beam report sending method, and all the embodiments of the above-mentioned beam report sending method are applicable to the terminal and can achieve the same beneficial effects.

FIG. 9 is another schematic view of a terminal in an embodiment of the present disclosure. Specifically, the terminal 900 in FIG. 9 may be a mobile phone, a tablet computer, a Personal Digital Assistant (PDA), or a vehicle-mounted computer.

The terminal 900 in FIG. 9 includes a radio frequency (RF) circuit 910, a memory 920, an input unit 930, a display unit 940, a processor 960, an audio circuit 970, a Wi Fi (Wireless Fidelity) module 980, and a power supply 990.

The input unit 930 may be configured to receive digital or character information input by a user, and generate signal inputs related to user settings and function control of the terminal 900. Specifically, in the embodiment of the present disclosure, the input unit 930 may include a touch panel 931. The touch panel 931, also known as a touch screen, can collect user's touch operations on or near it (such as the operation of the user on the touch panel 931 using any suitable object or accessory such as a finger, a stylus pen), and according to the preset settings A specific program drives the corresponding connected device. Optionally, the touch panel 931 may include a touch detection device and a touch controller. Among them, the touch detection device detects the user's touch position, and detects the signal brought by the touch operation, and transmits the signal to the touch controller; the touch controller receives touch information from the touch detection device, converts it into contact coordinates, and sends it The processor 960 can receive commands from the processor 960 and execute them. In addition, various types such as resistive, capacitive, infrared, and surface acoustic wave can be used to implement the touch panel 931. In addition to the touch panel 931, the input unit 930 may also include other input devices 932. Other input devices 932 may include, but are not limited to, a physical keyboard, function keys (such as volume control keys, switch keys, etc.), trackball, mouse, joystick, etc. One or more of them.

The display unit 940 may be configured to display information input by the user or information provided to the user and various menu interfaces of the terminal 900. The display unit 940 may include a display panel 941. Optionally, the display panel 941 may be configured in the form of an LCD or an Organic Light-Emitting Diode (OLED).

It should be noted that the touch panel 931 may cover the display panel 941 to form a touch display screen. When the touch display screen detects a touch operation on or near the touch display screen, it is transmitted to the processor 960 to determine the type of the touch event. The 960 provides corresponding visual output on the touch display according to the type of touch event.

The touch display includes an application program interface display area and commonly used controls display area. The arrangement manners of the display area of the application program interface and the display area of the commonly used controls are not limited, and may be an arrangement manner for distinguishing the two display areas, such as an up-down arrangement, an left-right arrangement, and the like. The application program interface display area can be used to display the interface of the application program. Each interface may include interface elements such as at least one application icon and/or widget desktop control. The application program interface display area can also be an empty interface without any content. This common control display area is used to display controls with high usage, such as setting buttons, interface numbers, scroll bars, application icons such as phonebook icons, and so on.

The processor 960 is the control center of the terminal 900, and uses various interfaces and lines to connect various parts of the entire mobile phone. By running or executing software programs and/or modules stored in the first memory 921, and calling stored in the second memory The data in 922 performs various functions of the terminal 900 and processes the data, thereby performing overall monitoring of the terminal 900. Optionally, the processor 960 may include one or more processing units.

In the embodiment of the present disclosure, the mobile terminal 900 further includes: a computer program stored on the memory 920 and executable on the processor 960. When the computer program is executed by the processor 960, the following steps are implemented: monitoring received signal strength information of at least one beam link; determining that a shielding event of the beam link is detected and sending a beam report to a network, in the case that a quantity of the beam link of which the received signal strength information meets a first preset condition is greater than or equal to a second preset quantity; where the beam report includes one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition, and fourth indication information indicating a reason why the terminal sends the beam report.

Optionally, the received signal strength information of the beam link includes a Received Signal Strength Indicator (RSSI) of the beam link.

Optionally, the computer program is executed by the processor 960 to perform: in the case that a downlink reference signal sent by the network is received on the beam link when monitoring the received signal strength information of the beam link, acquiring a Reference Signal Received Power (RSRP) of the beam link; and determining that the shielding event of the beam link is detected and sending the beam report to the network, in the case that the quantity of the beam link of which the received signal strength information meets the first preset condition is greater than or equal to a second preset quantity and a quantity of the beam link of which the RSRP is less than a third preset threshold value is greater than or equal to a third preset quantity.

Optionally, in the case that the received signal strength information is less than a fourth preset threshold value, the received signal strength information meets the first preset condition.

Optionally, the computer program is executed by the processor 960 to perform: sending the beam report to the network through a target resource; where the target resource includes any one of: a reserved resource configured by the network for the terminal, a resource through which the terminal reports a periodic beam report, a resource through which the terminal transmits a beam failure recovery request and a first uplink resource scheduled by the network for the terminal in the case that the shielding event of the target antenna panel is detected; where in the case that the target resource is the first uplink resource scheduled by the network for the terminal in the case that the shielding event of the target antenna panel is detected, the terminal carries the beam report by a Medium Access Control Control Element (MAC CE).

Optionally, the beam report further includes: identity information of a downlink transmission beam of at least one beam link recommended by the terminal to be switched to by the network.

Optionally, the beam report further includes: a RSRP of the at least one beam link recommended by the terminal to be switched to by the network.

Optionally, the computer program is executed by the processor 960 to perform: in the case that a downlink reference signal sent by the network is received on the at least one beam link to be switched to by the network when monitoring the received signal strength information of the at least one beam link recommended by the terminal to be switched to by the network, acquiring, according to the downlink reference signal, the RSRP of the at least one beam link to be switched to by the network; in the case that the downlink reference signal sent by the network is not received on the at least one beam link to be switched to by the network when monitoring the received signal strength information of the at least one beam link recommended by the terminal to be switched to by the network, estimating the RSRP of the at least one beam link to be switched to by the network, according to a RSRP of the at least one beam link to be switched to by the network which is acquired in a last measurement and a power attenuation of the at least one beam link to be switched to by the network which is measured by the terminal.

Optionally, the computer program is executed by the processor 960 to perform: acquiring a plurality of received signal strength information of the beam link detected within a preconfigured preset time period or within a preset time period configured by a network; acquiring a statistical average of the plurality of received signal strength information; and in the case that the statistical average is less than a fifth preset threshold value, determining that the received signal strength information of the beam link meet the first preset condition. The terminal 800 can implement the processes implemented by the terminal in the foregoing embodiments. To avoid repetition, details are not described herein again.

In summary, in the foregoing embodiments of the present disclosure, the terminal determines whether a shielding event occurs on the beam link according to the received signal strength information of the beam link, and can timely detect the shielding event of the beam link and trigger aperiodic reporting of the beam report. The received signal strength information of the beam link can be measured by the terminal when there is no reference signal, so the terminal can detect the beam link shielding event as early as possible, so that the network side can learn the shielding event earlier and perform a fast beam switching with the terminal, restore data transmission, thereby improving the reliability of data transmission. In addition, once the terminal finds a shielding event, it does not need to wait for the resources for the periodic beam report to report, but performs an aperiodic reporting, so that the network can learn and switch the beam as soon as possible. Through the content reported by the terminal, the network can learn that a shielding event has occurred, determine the beam switching and which beam to switch to, thereby quickly recovering data transmission and improving the stability of data transmission.

It should be noted that the terminal in the embodiment of the present disclosure is a terminal capable of executing the above-mentioned beam report sending method, and all the embodiments of the above-mentioned beam report sending method are applicable to the terminal and can achieve the same beneficial effects.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A person skilled in the art can use different methods to implement the described functions for each specific application, but such implementation should not be considered to be beyond the scope of the present disclosure.

Those skilled in the art can clearly understand that, for the convenience and brevity of description, the specific working processes of the systems, devices, and units described above can refer to the corresponding processes in the foregoing method embodiments, and are not repeated here.

In the embodiments provided in this application, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately physically, or two or more units may be integrated into one unit.

When the functions are implemented in the form of software functional units and sold or used as independent products, they can be stored in a computer-readable storage medium. Based on this understanding, the technical solution of the present disclosure is essentially a part that contributes to the existing technology or a part of the technical solution can be embodied in the form of a software product. The computer software product is stored in a storage medium, including Several instructions are used to cause a computer device (which may be a personal computer, a server, or a network device, etc.) to perform all or part of the steps of the method described in various embodiments of the present disclosure. The foregoing storage medium includes various media that can store program codes, such as a U disk, a mobile hard disk, a ROM, a RAM, a magnetic disk, or an optical disk.

Obviously, those skilled in the art can make various modifications and variations to the embodiments of the present disclosure without departing from the principle of the present disclosure. In this way, in the case that these modifications and variations of the embodiments of the present disclosure fall within the scope of the claims of the present disclosure and their equivalent technologies, the present disclosure also intends to include these changes and modifications.

What is claimed is:

1. A non-transitory computer-readable storage medium, wherein a computer program is stored in the computer-readable storage medium, a processor executes the computer program to:
   monitor a quality parameter of at least one beam link; and
   determine, according to the quality parameter of the beam link, at least one beam link subjected to a quality loss;
   in the case that at least a first preset quantity of beam link of the at least one beam link subjected to the quality loss is a beam link of a target antenna panel, determine that a shielding event of the target antenna panel is detected and sending a beam report to a network;
   wherein the beam report comprises one or more of: first indication information indicating an occurrence of the shielding event on the target antenna panel, a quantity of the beam link subjected to the quality loss, an identity of a downlink transmission beam of the beam link subjected to the quality loss, a quality parameter of the beam link subjected to the quality loss.

2. The non-transitory computer-readable storage medium according to claim 1, wherein the quality parameter of the beam link comprises: a Received Signal Strength Indicator (RSSI) of the beam link and/or a Reference Signal Received Power (RSRP) of the beam link.

3. The non-transitory computer-readable storage medium according to claim 1, wherein the processor executes the computer program to:
   in the case that the quality parameter of the beam link is less than a first preset threshold, determine that the beam link is subjected to the quality loss.

4. The non-transitory computer-readable storage medium according to claim 1, wherein the processor executes the computer program to:
send the beam report to the network through a target resource; wherein
the target resource comprises any one of: a reserved resource configured by the network for a terminal, a resource through which the terminal reports a periodic beam report, a resource through which the terminal transmits a beam failure recovery request and a first uplink resource scheduled by the network for the terminal in the case that the shielding event of the target antenna panel is detected; wherein
in the case that the target resource is the first uplink resource scheduled by the network for the terminal in the case that the shielding event of the target antenna panel is detected, the terminal carries the beam report by a Medium Access Control Control Element (MAC CE).

5. The non-transitory computer-readable storage medium according to claim 1, wherein the beam report further comprises: identity information of a downlink transmission beam of at least one beam link recommended by a terminal to be switched to by the network, wherein the at least one beam link recommended by the terminal to be switched to by the network is a beam link corresponding to an antenna panel other than the target antenna panel.

6. The non-transitory computer-readable storage medium according to claim 5, wherein the beam report further comprises: a RSRP of the downlink transmission beam of the at least one beam link recommended by the terminal to be switched to by the network.

7. The non-transitory computer-readable storage medium according to claim 1, wherein the processor executes the computer program to:
acquire a plurality of quality parameters of the beam link detected within a preconfigured preset time period or within a preset time period configured by the network;
acquire a statistical average of the plurality of quality parameters; and
in the case that the statistical average is less than a second preset threshold value, determine that the beam link is subjected to the quality loss.

8. A non-transitory computer-readable storage medium, wherein a computer program is stored in the computer-readable storage medium, a processor executes the computer program to:
monitor received signal strength information of at least one beam link;
determine that a shielding event of the beam link is detected and sending a beam report to a network, in the case that a quantity of the beam link of which the received signal strength information meets a first preset condition is greater than or equal to a second preset quantity; wherein
the beam report comprises one or more of: third indication information indicating an occurrence of the shielding event on the beam link, the quantity of the beam link of which the received signal strength information meets the first preset condition, an identity of a downlink transmission beam of the beam link of which the received signal strength information meets the first preset condition, the received signal strength information of the beam link of which the received signal strength information meets the first preset condition.

9. The non-transitory computer-readable storage medium according to claim 8, wherein the received signal strength information of the beam link comprises a Received Signal Strength Indicator (RSSI) of the beam link.

10. The non-transitory computer-readable storage medium according to claim 8, wherein the processor executes the computer program to:
in the case that a downlink reference signal sent by the network is received on the beam link when monitoring the received signal strength information of the beam link, acquire a Reference Signal Received Power (RSRP) of the beam link; and
the processor executes the computer program to:
determine that the shielding event of the beam link is detected and sending the beam report to the network, in the case that the quantity of the beam link of which the received signal strength information meets the first preset condition is greater than or equal to a second preset quantity and a quantity of the beam link of which the RSRP is less than a third preset threshold value is greater than or equal to a third preset quantity.

11. The non-transitory computer-readable storage medium according to claim 8, wherein in the case that the received signal strength information is less than a fourth preset threshold value, the received signal strength information meets the first preset condition.

12. The non-transitory computer-readable storage medium according to claim 8, wherein the processor executes the computer program to:
send the beam report to the network through a target resource; wherein
the target resource comprises any one of: a reserved resource configured by the network for a terminal, a resource through which the terminal reports a periodic beam report, a resource through which the terminal transmits a beam failure recovery request and a first uplink resource scheduled by the network for the terminal in the case that the shielding event of the target antenna panel is detected; wherein
in the case that the target resource is the first uplink resource scheduled by the network for the terminal in the case that the shielding event of the target antenna panel is detected, the terminal carries the beam report by a Medium Access Control Control Element (MAC CE).

13. The non-transitory computer-readable storage medium according to claim 8, wherein the beam report further comprises: identity information of a downlink transmission beam of at least one beam link recommended by a terminal to be switched to by the network.

14. The non-transitory computer-readable storage medium according to claim 13, wherein the beam report further comprises: a RSRP of the at least one beam link recommended by the terminal to be switched to by the network.

15. The non-transitory computer-readable storage medium according to claim 14, wherein the processor executes the computer program to:
in the case that a downlink reference signal sent by the network is received on the at least one beam link to be switched to by the network when monitoring the received signal strength information of the at least one beam link recommended by the terminal to be switched to by the network, acquire, according to the downlink reference signal, the RSRP of the at least one beam link to be switched to by the network;
in the case that the downlink reference signal sent by the network is not received on the at least one beam link to be switched to by the network when monitoring the received signal strength information of the at least one beam link recommended by the terminal to be switched to by the network, estimate the RSRP of the at least one beam link to be switched to by the network, according to a RSRP of the at least one beam link to be switched to by the network which is acquired in a last measurement and a power attenuation of the at least one beam link to be switched to by the network which is measured by the terminal.

16. The non-transitory computer-readable storage medium according to claim 8, wherein the processor executes the computer program to:
- acquire a plurality of received signal strength information of the beam link detected within a preconfigured preset time period or within a preset time period configured by the network;
- acquire a statistical average of the plurality of received signal strength information; and
- in the case that the statistical average is less than a fifth preset threshold value, determine that the received signal strength information of the beam link meet the first preset condition.

\* \* \* \* \*